United States Patent
Ganapathiappan et al.

(10) Patent No.: US 8,226,757 B2
(45) Date of Patent: Jul. 24, 2012

(54) PHTHALOCYANINE DYE AND INK CONTAINING THE SAME

(75) Inventors: Sivapackia Ganapathiappan, Palo Alto, CA (US); Jayprakash C. Bhatt, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 370 days.

(21) Appl. No.: 12/603,994

(22) Filed: Oct. 22, 2009

(65) Prior Publication Data

US 2011/0094413 A1 Apr. 28, 2011

(51) Int. Cl.
*C09D 11/02* (2006.01)
*C09B 47/04* (2006.01)

(52) U.S. Cl. .................... 106/31.49; 540/140
(58) Field of Classification Search ............. 106/31.49; 540/129, 132, 140
See application file for complete search history.

(56) References Cited

U.S. PATENT DOCUMENTS

| | | | |
|---|---|---|---|
| 5,346,670 A * | 9/1994 | Renzoni et al. ............. 540/139 |
| 5,614,008 A * | 3/1997 | Escano et al. ............. 106/31.49 |
| 5,709,717 A | 1/1998 | Reddig et al. |
| 5,780,621 A | 7/1998 | Harms et al. |
| 5,804,102 A * | 9/1998 | Oi et al. ..................... 252/587 |
| 5,847,114 A * | 12/1998 | Thetford et al. ............. 540/140 |
| 5,953,857 A * | 9/1999 | Aiga et al. ..................... 524/88 |
| 5,998,609 A * | 12/1999 | Aoki et al. ..................... 540/140 |
| 6,472,523 B1 * | 10/2002 | Banning et al. ............. 540/139 |
| 6,498,249 B1 | 12/2002 | Snow et al. |
| 7,005,518 B2 | 2/2006 | Peng et al. |
| 7,314,511 B2 * | 1/2008 | Campbell et al. .......... 106/31.49 |
| 7,417,141 B2 * | 8/2008 | Vonwiller et al. ............. 540/145 |
| 7,449,058 B2 | 11/2008 | Patel |
| 7,470,315 B2 * | 12/2008 | Vonwiller et al. .......... 106/31.49 |
| 7,579,064 B2 * | 8/2009 | Vonwiller et al. .......... 106/31.49 |
| 8,057,589 B2 * | 11/2011 | Banning ..................... 106/31.49 |
| 2003/0092907 A1 | 5/2003 | Snow et al. |
| 2004/0171827 A1 | 9/2004 | Peng et al. |
| 2004/0187734 A1 | 9/2004 | Ozawa et al. |
| 2005/0039274 A1 | 2/2005 | Yang et al. |
| 2005/0200803 A1 | 9/2005 | Snow et al. |
| 2006/0027138 A1 * | 2/2006 | Vonwiller et al. .......... 106/31.49 |
| 2006/0030705 A1 * | 2/2006 | Vonwiller et al. ............. 540/139 |
| 2006/0162615 A1 | 7/2006 | Patel |
| 2006/0201387 A1 | 9/2006 | Patel |
| 2007/0181034 A1 * | 8/2007 | Dodge et al. ................ 106/31.49 |
| 2008/0199732 A1 * | 8/2008 | Lee et al. ..................... 540/140 |
| 2009/0226835 A1 * | 9/2009 | Mayo et al. ................ 106/31.49 |

* cited by examiner

*Primary Examiner* — Helene Klemanski
(74) *Attorney, Agent, or Firm* — Sandra B. Beccarelli

(57) ABSTRACT

Phthalocyanine dyes represented by the general structures (I) to (IV) and inkjet ink formulation including the phthalocyanine dyes.

23 Claims, 2 Drawing Sheets

PHTHALOCYANINE DYE AND INK CONTAINING THE SAME

BACKGROUND

Phthalocyanines are macrocyclic compounds that have strong pigmenting power attributed to their alternating nitrogen and carbon atom central ring structures of porphyrin compounds, i.e., benzene-porphyrin. As such, phthalocyanine compounds are useful in dyes with a plethora of applications in biology and chemistry as well as industry. The central nitrogen atoms of a pyrroline portion of the porphyrin compounds may be either complexed with a metal or are metal-free to provide further variations in color. For example, metal-free phthalocyanine has a blue-green color while copper-complexed phthalocyanine has a blue color (Pigment Blue 15). Other substitutions on the phthalocyanine compounds invoke other colors as well. In general, these dyes exhibit absorption at wavelengths up to 1000 nm. Phthalocyanines are chemically stable compounds that are normally not soluble in water or aqueous solutions. Water soluble groups can be added to increase the water solubility of the phthalocyanine compounds. To solubilize either of their structures, one or both of highly ionic groups and soluble ethylene oxide groups can be attached to dissolve them in water. Water soluble cyanine, phthalocyanine compounds with near IR absorption have relatively poor stability in water or aqueous solution. Any degradation in solution that changes their physical or chemical nature can destroy their conjugation, such that their characteristic absorption (color) may be lost. Hence, dye with absorption greater than 700 nm that is water soluble and stable in aqueous solution over time would satisfy a long felt need.

BRIEF DESCRIPTION OF THE DRAWINGS

In order to better understand the present invention, some embodiments will be described below by way of non-limiting examples only, with reference to figures, wherein.

DETAILED DESCRIPTION

Figure 1:
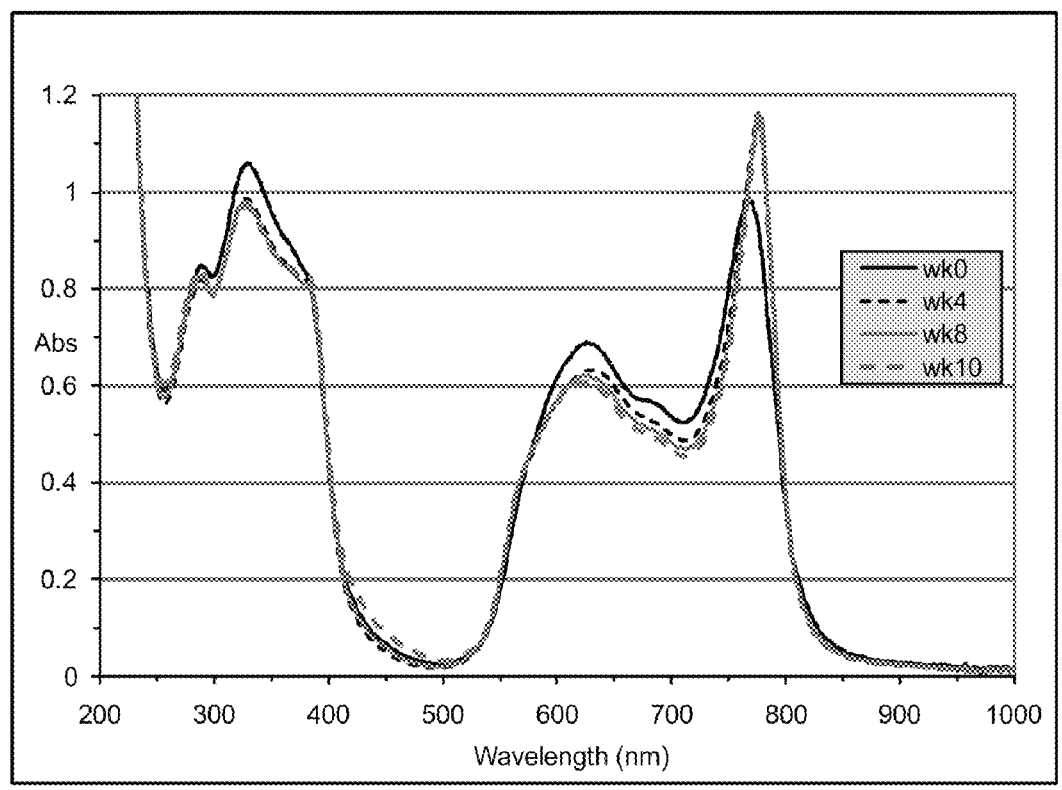
FIG. 1 represents an absorption spectrum in water of a phthalocyanine dye according to one embodiment of the present invention.

Before particular embodiments of the present invention are disclosed and described, it is to be understood that the present invention is not limited to the particular process and materials disclosed herein as such and may vary to some degree. It is also to be understood that the terminology used herein is used for the purpose of describing particular embodiments only and is not intended to be limiting, as the scope of the present invention will be defined only by the appended claims and equivalents thereof. Moreover, examples herein are intended to be illustrative only and are presented for discussion purposes and not by way of limitation. For simplicity herein, no distinction is made between the term 'species' as referring to a single item (e.g., a single species, etc.) and a plurality of such items unless such a distinction is necessary for proper understanding. Further, as used herein, the article 'a' is intended to have its ordinary meaning in the patent arts, namely 'one or more'. For example, 'a substituent' generally means one or more substituents and as such, 'the substituent' means 'the substituent(s)' herein. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc. The phrase "at least" as used herein means that the number of specified items may be equal to or greater than the number recited. The phrase "about" as used herein means that the number recited may differ by plus or minus 10%; for example, "about 5" means a range of 4.5 to 5.5. The term "between" when used in conjunction with two numbers such as, for example, "between about 2 and about 50" includes both of the numbers recited. Moreover, examples herein are intended to be illustrative only and are presented for discussion purposes and not by way of limitation.

Embodiments of the present disclosure relate to phthalocyanine dyes having extended conjugation with a near-infrared (NIR) absorption greater than 700 nm. In an embodiment, the present disclosure relates to phthalocyanine dyes having absorptions in the range of 700 to 1000 nm; in another embodiment, in the range of 800 to 1000 nm. In an embodiment of the present disclosure, the phthalocyanine dyes are water soluble, dispersible in aqueous solution, dispersible in aqueous blend solutions and dispersible in solvent soluble compounds. In another embodiment, the phthalocyanine dyes exhibit long term stability in such solutions.

Without being limited by the theory, it is believed that the solubility and dispersibility in various suspensions are attributed, in part, to water soluble substituent groups on the phthalocyanine components of the dye. Furthermore, it is believed that the presence of multiple different substituent groups, such as alkyl, alkoxy or aryl groups, disturbs the symmetry of phthalocyanine dyes and results therefore in dyes that don't aggregate in solution. In an embodiment, in order to disturb the symmetry, mixed substituents are incorporated in the benzene rings. Indeed, molecules having symmetrical structure can aggregate easily out of the solution. Thus, in an embodiment, the dyes according to the present disclosure have a non-symmetrical structure, which disturbs the symmetry, and which results then in dyes that do not aggregate in solution and that are easily soluble. Moreover, greater respective solubility and dispersibility may increase the extinction coefficient of phthalocyanine dyes. Thus, in an embodiment, the presence of multiple different substituent groups disturbs the symmetry of phthalocyanine dyes and results in an increase of the extinction coefficient.

The extinction coefficient defines how strongly a chemical species will absorb light at a given wavelength either per mass, per mole or per concentration. As such, an increased extinction coefficient means that a smaller quantity of phthalocyanine dyes may be used for a desired application. Therefore, only a minor amount of phthalocyanine dyes, as described in the present disclosure, will be needed for the practical applications by comparison with other dyes. Thus, in an embodiment, inks containing such dyes have the benefit of being more stable and do not present any crystallization of these dyes.

In an embodiment, the present disclosure describes water soluble phthalocyanine dye chromophores having extended conjugation with mixed substituents so that near-IR absorptions can be from 700 to 1000 nm range. Furthermore, in an embodiment, the present disclosure describes water soluble phthalocyanine dyes that exhibit high extinction coefficient. In an embodiment, these dyes are chemically stable in water as well as in aqueous solvent blends at wide pH range and are very well suited for water based inkjet ink applications.

Without being linked by the theories, it is believed that the various substituents included in the chemical structures of the NIR-absorbing phthalocyanine dye embodiments render the dye embodiments soluble or dispersible in either water soluble ink formulations or solvent soluble ink formulations and blends thereof. The NIR-absorbing phthalocyanine dye embodiments of the present invention find use in many different water-based systems such as coatings and inks.

In an embodiment, the absorption of the phthalocyanine dye described herein is in the near infrared (NIR) range and ranges from 700 nm to 1000 nm. In another embodiment, the extended conjugation of the phthalocyanine dye shifts the absorption to greater than 800 nm.

In one embodiment, the present disclosure refers to a phthalocyanine dye represented by one of the general structures (I) to (IV) illustrated below:

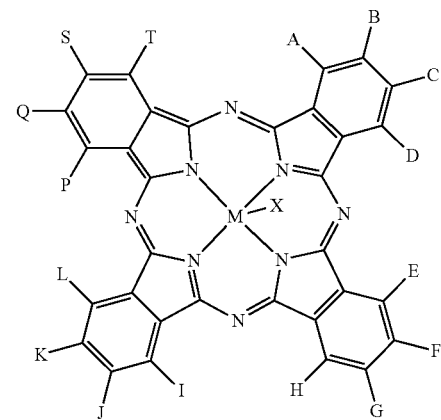

(I)

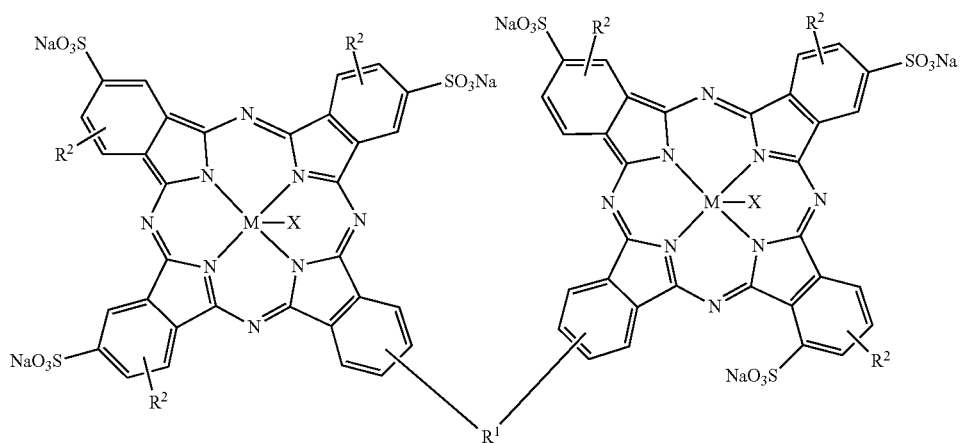

(II)

-continued

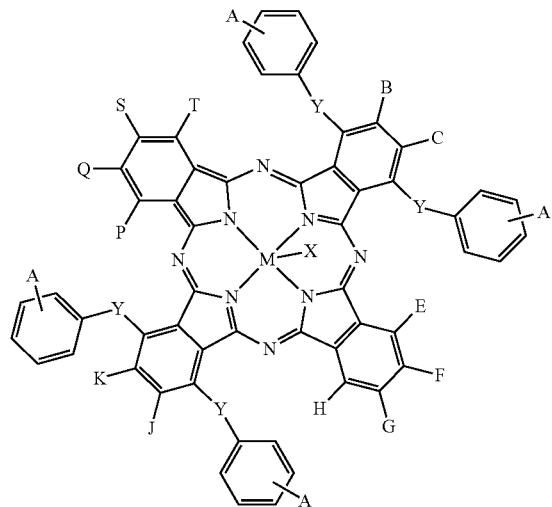

(III)

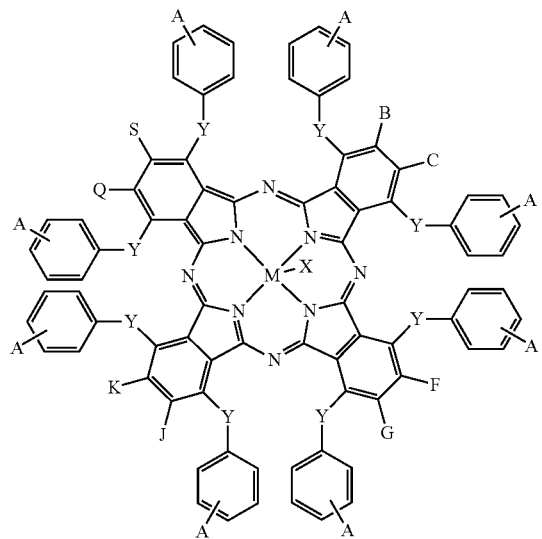

(IV)

wherein, in these formulas:

X is OH, Cl, Br, F, an alkoxy group, a substituted alkoxy group, an acetyl group, a substituted acetyl group or $OSO_3M^2$;

M is a metal ion selected form the group consisting of In, Y, Sc, Ga, Tl or Al;

A to L and P, Q, S and T are independently H, an alkyl group, a substituted alkyl group, an aryl group, a substituted aryl group, a thioalkyl or thioaryl group, a substituted thioalkyl or thioaryl group, an alkoxy group, a substituted alkoxy group, $SO_3M^2$, OH, SH, $NH_2$, $OCOR^2$, $COOM^2$, $PO_3M^2{}_2$, $N(R^3)_3{}^+X'^-$ (with X' being Cl, Br, $OSO_3$ or $ClO_4$), or $O(CH_2CH_2O)_mCH_3$ with m being from 1 to 500; wherein, in formula (I), at least one of the substituents A to L, P, Q, S or T is selected from the group consisting of $SO_3M^2$, OH, $OCOR^2$; $COOM^2$, $PO_3M^2{}_2$, $N(R^3)_3{}^+X'^-$ (with X' being Cl, Br, $OSO_3$ or $ClO_4$), $O(CH_2CH_2O)_mCH_3$ with m being from 1 to 500; and wherein, in formulas (III) and (IV), at least one substituent A is selected from the group consisting of $SO_3M^2$, OH, $OCOR^2$; $COOM^2$, $PO_3M^2{}_2$, $N(R^3)_3{}^+X'^-$ (with X' being Cl, Br, $OSO_3$ or $ClO_4$), $O(CH_2CH_2O)_mCH_3$ with m being from 1 to 500;

$R^1$ is a divalent linking group selected from the group consisting of O, CO, COO, $C_nH_{2n}$ wherein n is from 1 to 4, NH, CONH, S, $SO_2$ and $SO_2NH$;

$R^2$ is H, an alkyl group, a substituted alkyl group or any other monovalent organic groups such as alkoxy group or aryloxy group;

Y is independently selected from O, NH or S;

$M^2$ is independently selected from H or a monovalent metal cation such as $Na^+$ or $K^+$ or $N(R^3)_4{}^+$;

$R^3$ is independently selected from H, an alkyl group, a substituted alkyl group, an aryl group and a substituted aryl group.

In an embodiment of the present disclosure, the alkyl groups and substituted alkyl groups that might be present on the phthalocyanine dye described herein are lower alkyl groups or lower substituted alkyl groups. In an embodiment of the present disclosure, the aryl groups and substituted aryl groups that might be present on the phthalocyanine dye described herein are lower aryl groups or lower substituted aryl groups. In an embodiment of the present disclosure, the alkoxy groups and substituted alkoxy groups that might be present on the phthalocyanine dye described herein are lower alkoxy groups or lower substituted alkoxy groups. In an embodiment of the present disclosure, the aryloxy groups and substituted aryloxy groups that might be present on the phthalocyanine dye described herein are lower aryloxy groups or lower substituted aryloxy groups. By lower it is meant herein that these groups have from 1 to 6 carbon atoms.

In an embodiment of the present disclosure, in the phthalocyanine dye according to the general structures (I) to (IV), M is a metal ion. In an embodiment, the metal M is a divalent metal complexed with the nitrogen atoms of the pyrrole moieties at the nucleus of the phthalocyanine component. The linked X group provides one or more of further solubility, further dispersibility and other functionality including, but not limited to, changing the absorption range of the phthalocyanine dye for the purposes of some embodiments of the present invention. In an embodiment of the present disclosure, in the phthalocyanine dye according to the general structures (I) to (IV), M is a metal selected from the group consisting of In, Y, Sc, Ga, Tl and Al. In another embodiment, in the phthalocyanine dye according to general structures (I) to (IV), M is a metal selected from the group consisting of Ga or In. In yet another embodiment, the metal M is indium (In).

In an embodiment of the present disclosure, in the phthalocyanine dye according to general structures (I) to (IV), X is Cl, OH or $OSO_3M^2$, with $M^2$ being independently selected from H or a monovalent metal cation or a lower alkyl group. In another embodiment, X is Cl, OH or $OSO_3M^2$ with $M^2$ being Na. In yet another embodiment, X is $OSO_3Na$. And, in yet another embodiment, X is Cl.

In another embodiment, in phthalocyanine dye according to general structures (I) to (IV), X is an alkoxy group having the formula $OC_nH_{2n+1}$ wherein n is from 1 and 8. In yet another embodiment, X is an alkoxy group having the formula $OC_nH_{2n+1}$ wherein n is from 1 to 4. In yet another embodiment, X is an alkoxy group having the formula $OC_nH_{2n+1}$ wherein n is 4. Thus, in embodiments of the present disclosure, in the phthalocyanine dye according to general structures (I) to (IV), X is Cl, OH or $OSO_3M^2$ with $M^2$ being Na or an alkoxy group having the formula $OC_nH_{2n+1}$ wherein n ranges from 1 and 8.

In an embodiment, the present disclosure refers to a phthalocyanine dye having the general structure (I) wherein X is OH, Cl, Br, F, an alkoxy group, a substituted alkoxy group, an acetyl group, a substituted acetyl group or $OSO_3M^2$, with $M^2$ being Na.

In another embodiment, the present disclosure refers to a phthalocyanine dye having the general structure (I) wherein the substituents A to L and P, Q, S and T are independently H, an alkyl group, a substituted alkyl group, an aryl group, a substituted aryl group, a thioalkyl group, a substituted thioalkyl group, an alkoxy group, a substituted alkoxy group, $SO_3M^2$, OH, SH, $NH_2$, $COOM^2$, $PO_3M^2{}_2$, $N(R^3)_3{}^+X'{}^-$ (with X' being Cl, Br, $OSO_3$ or $ClO_4$), or $O(CH_2CH_2O)_mCH_3$ wherein m is from 1 to 100, in an embodiment from 1 to 10; and, wherein in formula (I), at least one of the substituents A to L, P, Q, S or T is a water soluble group selected from the group consisting of: $SO_3M^2$, OH, $COOM^2$, $PO_3M^2{}_2$, N $(R^3)_3{}^+X'{}^-$ (with X' being Cl, Br, $OSO_3$ or $ClO_4$), $O(CH_2CH_2O)_mCH_3$ wherein m is from 1 to 100, in an embodiment from 1 to 10, with $M^2$ being Na and with $R^3$ being H.

In another embodiment, the substituents A to L and P, Q, S and T are, independently, H, an alkyl group, a substituted alkyl group, an aryl group, a substituted aryl group, a thioalkyl group, a substituted thioalkyl group, an alkoxy group, a substituted alkoxy group, OH, SH, $NH_2$, $COO^-Na^+$, $N(H)_3{}^+X'{}^-$ (with X' being Cl, Br, $OSO_3$ or $ClO_4$), or $O(CH_2CH_2O)_mCH_3$ wherein m is from 1 to 100; and wherein in formula (I), at least one of the substituents A to L, P, Q, S or T is $SO_3Na$.

In an embodiment of the present disclosure, in the phthalocyanine dye according to the general structure (I), X is Cl or OH or $OSO_3M^2$, with $M^2$ being independently selected from H or a monovalent metal cation or a lower alkoxy group. In another embodiment, X is Cl or OH or $OSO_3M^2$ with $M^2$ being Na. In yet another embodiment, X is $OSO_3Na$. In yet another embodiment, X is Cl.

In an embodiment, in the phthalocyanine dye according to the general structure (I), X is an alkoxy group having the formula $OC_nH_{2n+1}$ wherein n ranges from 1 and 8. In another embodiment, X is an alkoxy group having the formula $OC_nH_{2n+1}$ wherein n is from 1 to 4. In yet another embodiment, X is an alkoxy group having the formula $OC_nH_{2n+1}$ wherein n is 4.

In an embodiment of the present disclosure, in the phthalocyanine dye according to the general structure (I), M is Ga or In and, in another embodiment, M is indium (In).

In an embodiment of the present disclosure, in the phthalocyanine dye according to the general structure (I), the substituents A to L and P, Q, S and T are independently H or $SO_3M^2$ and with $M^2$ being independently selected from H or a monovalent metal cation. In another embodiment, the substituents A to L and P, Q, S and T are $SO_3M^2$ with $M^2$ being Na; $NH_2$, SH or $COOM^2$ with $M^2$ being Na; an alkyl group having the formula $C_nH_{2n+1}$ wherein n is from 1 to 4; in another embodiment, an alkyl group having the formula $C_nH_{2n+1}$ wherein n is 4; an alkoxy group having the formula $OC_nH_{2n+1}$ wherein n is from 1 to 4; in another embodiment, an alkyl group having the formula $OC_nH_{2n+1}$ wherein n is 4. And wherein, in the phthalocyanine dye according to the general structure (I), at least one of the substituents A to L, P, Q, S or T is a water soluble group selected from the group consisting of $SO_3M^2$, OH, $COOM^2$, $PO_3M^2{}_2$, $N(R^3)_3{}^+X'{}^-$ (with X' being Cl, Br, $OSO_3$ or $ClO_4$), or $O(CH_2CH_2O)_mCH_3$ wherein m is from 1 to 100, in an embodiment, from 1 to 10. In another embodiment, at least one of the substituents A to L, P, Q, S or T is $SO_3M^2$ with $M^2$ being Na. In another embodiment, at least one of the substituents A to L, P, Q, S or T is an alkoxy group, having the formula $OC_nH_{2n+1}$ wherein n is from 1 to 4; in another embodiment, an alkoxy group, having the formula $OC_nH_{2n+1}$ wherein n is 4.

In an embodiment, the phthalocyanine dye of the present disclosure is a phthalocyanine dye having the general structure (I) and wherein X is Cl; M is In; A, C, D, E, F, H, I, K, L, P, S and T are H; and B, G, J and Q are $SO_3Na$.

In another embodiment, phthalocyanine dye of the present disclosure is a phthalocyanine dye having one the formulas (V) to (X) such as illustrated below:

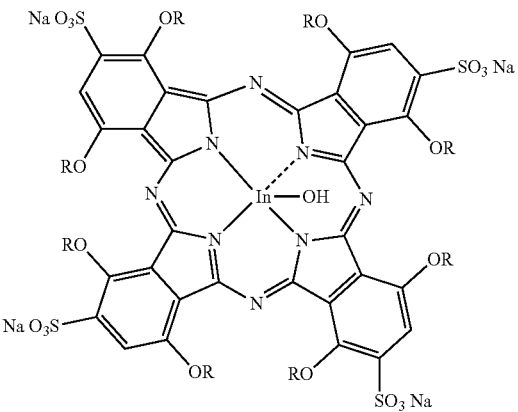

(V)

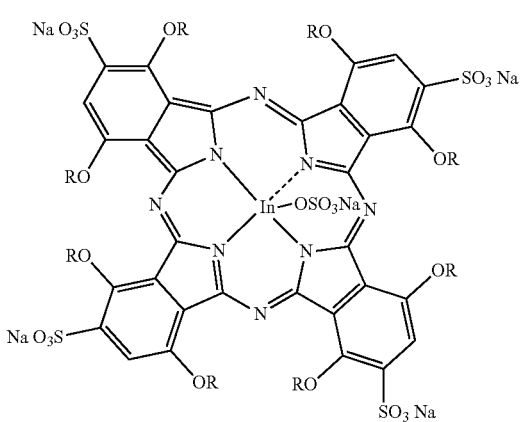

(VI)

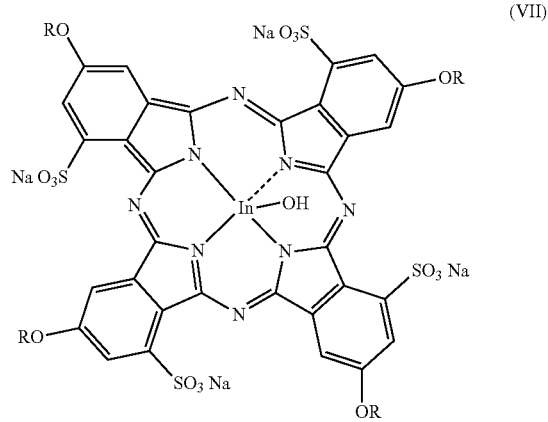

(VII)

-continued

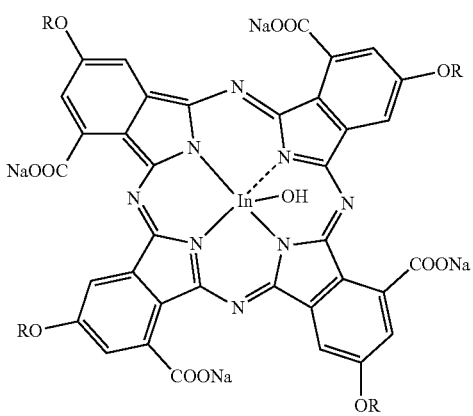

(VIII)

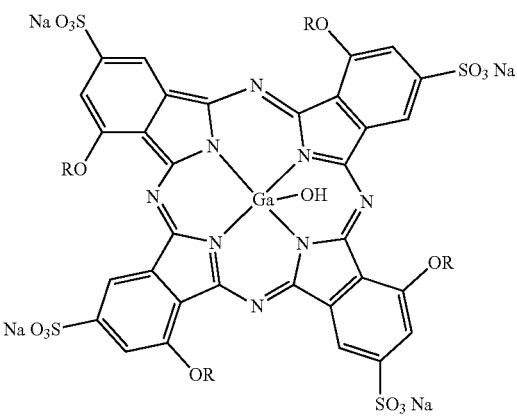

(IX)

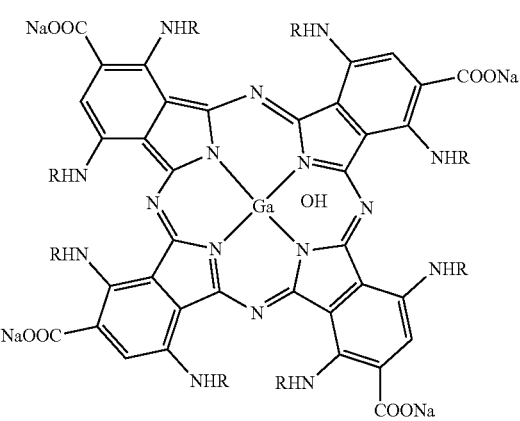

(X)

wherein, in these formulas (V) to (X), R is an alkyl group, having the formula $C_nH_{2n+1}$ with n is from 1 to 8. In another embodiment, R is an alkyl group, having the formula $C_nH_{2n+1}$ with n is from 1 to 4; and in yet another embodiment, an alkyl group having the formula $C_nH_{2n+1}$ with n being 4.

In another embodiment, the present disclosure refers to a phthalocyanine dye having the general structure (II) wherein:

X is OH, Cl, Br, F, an alkoxy group, a substituted alkoxy group, an acetyl group, a substituted acetyl group or $OSO_3M^2$, with $M^2$ being $Na^+$;

M is a metal ion selected form the group consisting of In, Y, Sc, Ga, Tl or Al;

$R^1$ is selected from the group consisting of O, CO, COO, $C_nH_{2n}$ wherein n is from 1 to 4, NH and S;

$R^2$ is H, an alkyl group, a substituted alkyl group or any other monovalent organic groups such as alkoxy group or aryloxy group.

In an embodiment of the present disclosure, in the phthalocyanine dye according to the general structure (II), M is Ga or In and, in another embodiment, M is indium (In).

In an embodiment, in the phthalocyanine dye according to the general structure (II), X is OH or $OSO_3M^2$ with $M^2$ is Na. In yet another embodiment, X is $OSO_3Na$. In another embodiment, in the phthalocyanine dye according to the general structure (II), X is an alkoxy group having the formula $OC_nH_{2n+1}$ wherein n is from 1 to 4. In yet another embodiment, X is an alkoxy group having the formula $OC_nH_{2n+1}$ wherein n is 4. In another embodiment, in the phthalocyanine dye according to the general structure (II), X is Cl.

In an embodiment of the present disclosure, in the phthalocyanine dye according to the general structure (II), $R^1$ is a divalent linking group that independently includes one or a combination of oxygen, nitrogen, sulfur and carbon. In some embodiments, the divalent linking group $R^1$ is selected from the group consisting of O, $C_nH_{2n}$ wherein n is from 1 to 4, NH, COO, CONH, CO, $SO_3$ and $SO_2NH$. In another embodiment, $R^1$ is O, $C_nH_{2n}$, wherein n is from 1 to 4, or CO. In another embodiment, $R^1$ is O, $C_nH_{2n}$ wherein n is 1 or 2 or CO. In yet another embodiment, $R^1$ is O.

In an embodiment of the present disclosure, in the phthalocyanine dye according to the general structure (II), $R^2$ is H or an alkyl group having the formula $C_nH_{2n+1}$ wherein n is from 1 to 4. In another embodiment, in the phthalocyanine dye according to the general structure (II), $R^2$ is an alkyl group having the formula $C_nH_{2n+1}$ wherein n is from 1 to 4; in another embodiment, $R^2$ is an alkyl group having the formula $C_nH_{2n+1}$ wherein n is 4.

In another embodiment, the phthalocyanine dye of the present disclosure is a phthalocyanine dye having one of the formulas (XI), (XII) or (XIII) such as illustrated below.

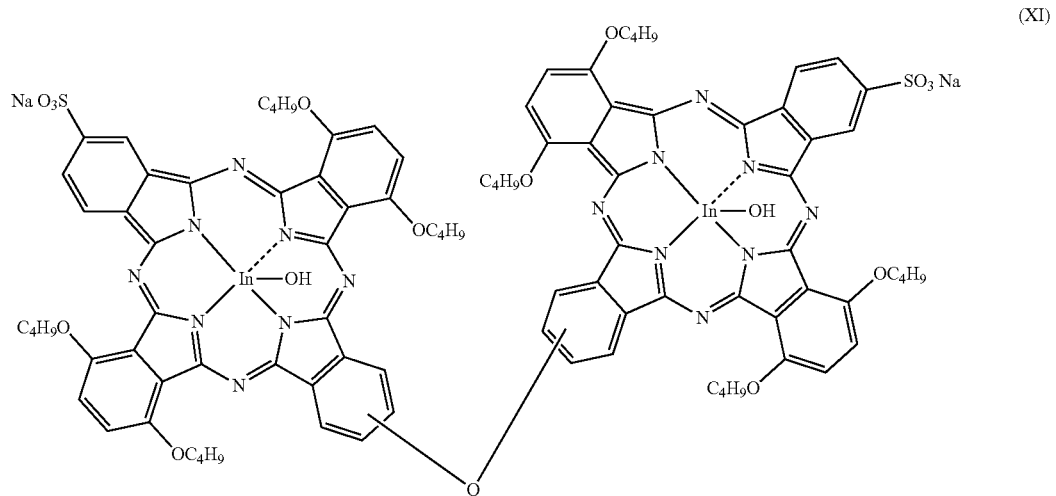
(XI)
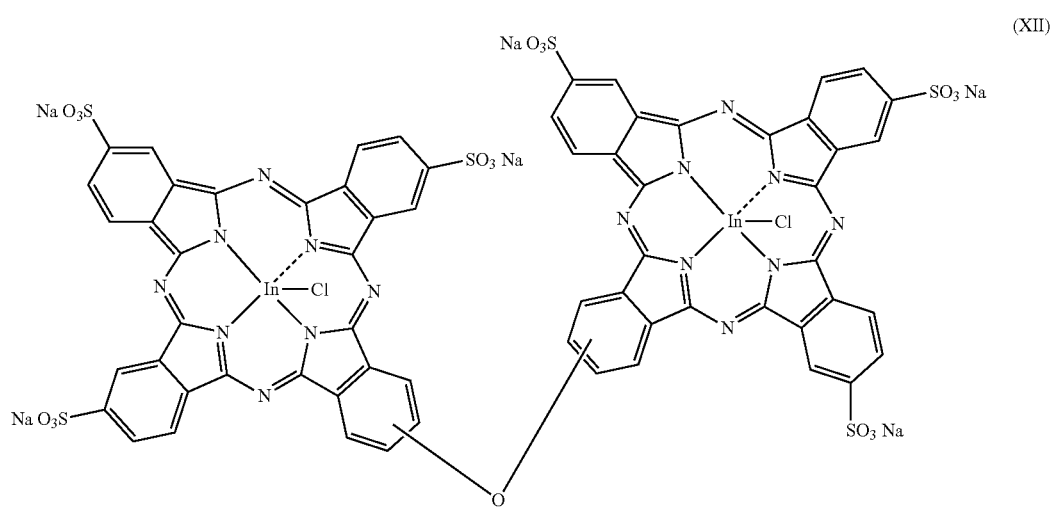
(XII)
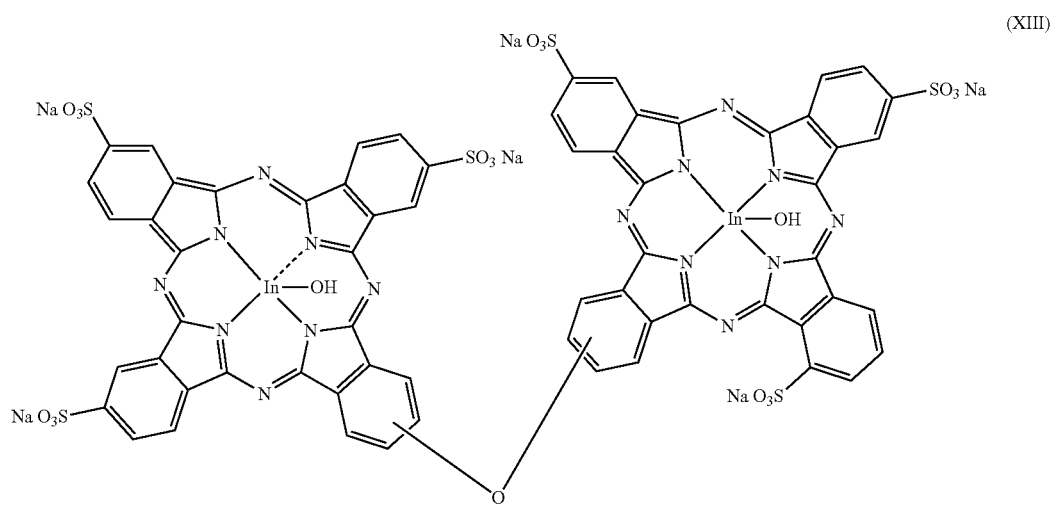
(XIII)

In another embodiment, the present disclosure refers to a phthalocyanine dye having the general structure (III) or (IV) wherein:

X is OH, Cl, Br, F, an alkoxy group, a substituted alkoxy group, an acetyl group, a substituted acetyl group or $OSO_3M^2$, with $M^2$ being Na;

M is a metal ion selected form the group consisting of In, Y, Sc, Ga, Tl or Al;

Y is independently selected from O, NH or S;

Substituents B to L and P, Q, S and T are independently H, an alkyl group, a substituted alkyl group, an aryl group, a substituted aryl group, a thioalkyl or thioaryl group, a substituted thioalkyl or thioaryl group, an alkoxy group, a substituted alkoxy group, $SO_3M^2$, OH, SH, $NH_2$, $COOM^2$, $PO_3M^2_2$, $N(R^3)_3{}^+X'^-$ (with X' being Cl, Br, $OSO_3$ or $ClO_4$) or $O(CH_2CH_2O)_m CH_3$ wherein m is from 1 to 100, in an embodiment from 1 to 10;

At least one substituent A is selected from the group consisting of $SO_3M^2$, OH, $COOM^2$, $PO_3M^2_2$, $N(R^3)_3{}^+X'^-$ (with X' being Cl, Br, $OSO_3$ or $ClO_4$), $O(CH_2CH_2O)_m CH_3$ wherein m is from 1 to 100, in an embodiment from 1 to 10; with $M^2$ being independently selected from H or a monovalent metal cation. In an embodiment the monovalent cation is $Na^+$ or $K^+$ or $N(R^3)_4{}^+$ with $R^3$ being independently selected from H, an alkyl group, a substituted alkyl group, an aryl group and a substituted aryl group.

In an embodiment of the present disclosure, in the phthalocyanine dye according to the general structures (III) or (IV), M is Ga or In and, in another embodiment, M is indium (In).

In an embodiment of the present disclosure, in the phthalocyanine dye according to the general structures (III) or (IV), X is Cl, OH or $OSO_3M^2$ with $M^2$ being Na. In another embodiment, X is $OSO_3Na$. In yet another embodiment, in the phthalocyanine dye according to the general structures (III) or (IV), X is Cl.

In an embodiment, in the phthalocyanine dye according to the general structures (III) or (IV), A is $SO_3M^2$ with $M^2$ being Na.

In an embodiment of the present disclosure, in the phthalocyanine dye according to the general structures (III) or (IV), the substituents B to L and P, Q, S and T are independently H or an alkyl group having the formula $C_nH_{2n+1}$ wherein n is from 1 to 4. In another embodiment, in the phthalocyanine dye according to the general structures (III) or (IV), substituents B to L and P, Q, S and T are H.

In an embodiment, in the phthalocyanine dye according to the general structures (III) or (IV), Y is O or S.

In another embodiment, the phthalocyanine dye of the present disclosure is a phthalocyanine dye having one of the formulas (XIV), (XV) or (XVI) such as illustrated below.

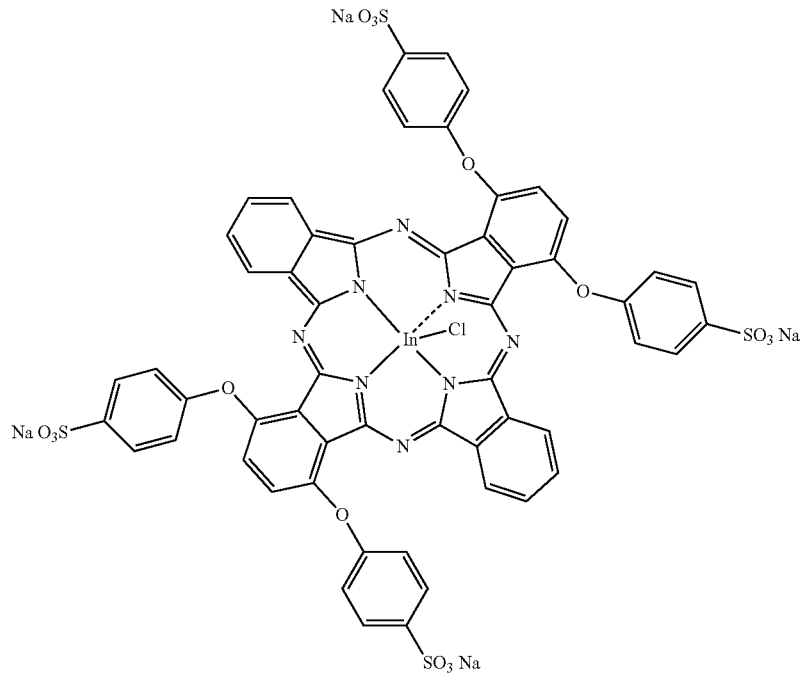

(XIV)

-continued
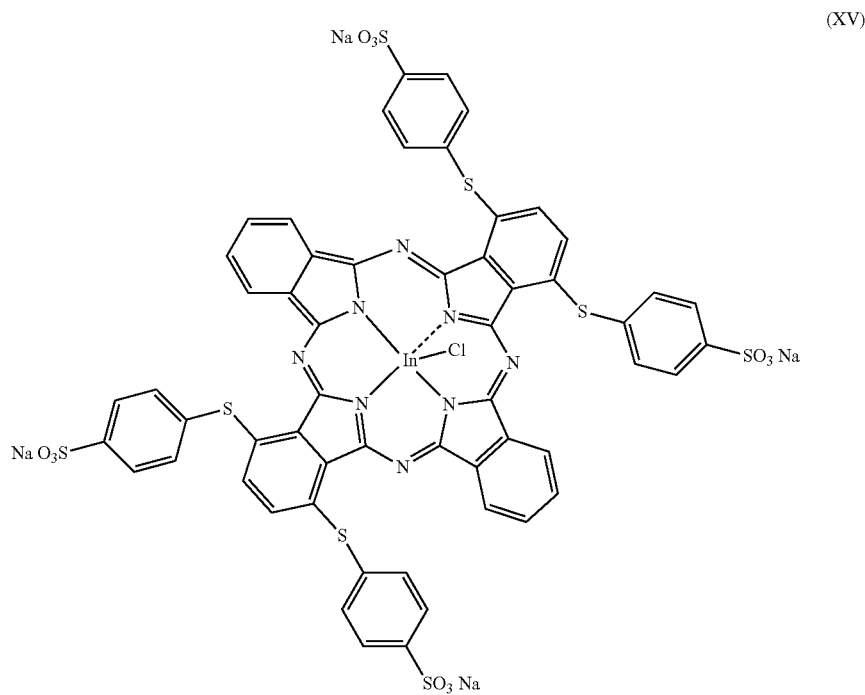
(XV)
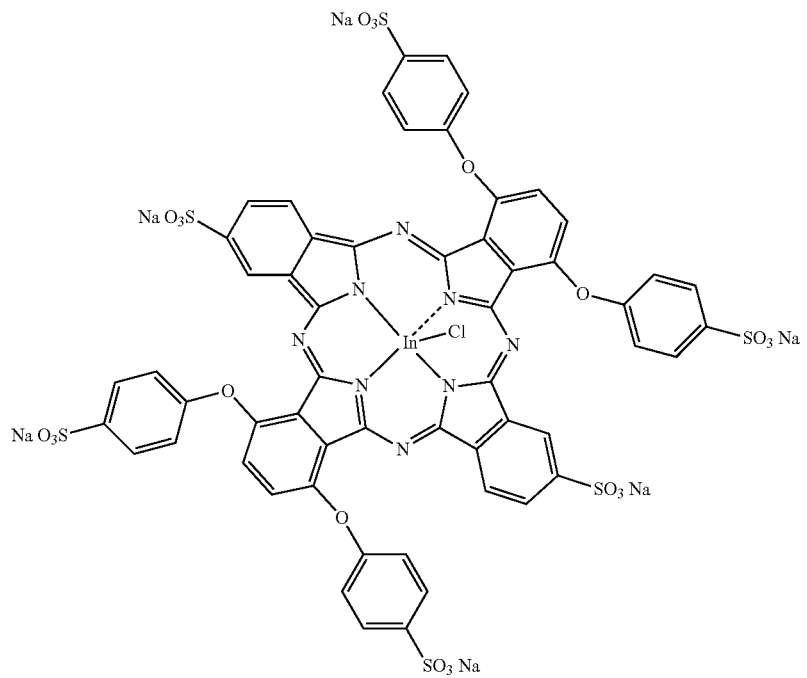
(XVI)

In another embodiment, the phthalocyanine dye of the present disclosure is a phthalocyanine dye having one of the formulas (XVII) or (XVIII) such as illustrated below.

the substituents A, B to L and P, Q, S and T and the substituents $R^2$ are soluble groups that, at least, provide water solubility-dispersibility to the phthalocyanine dyes according to

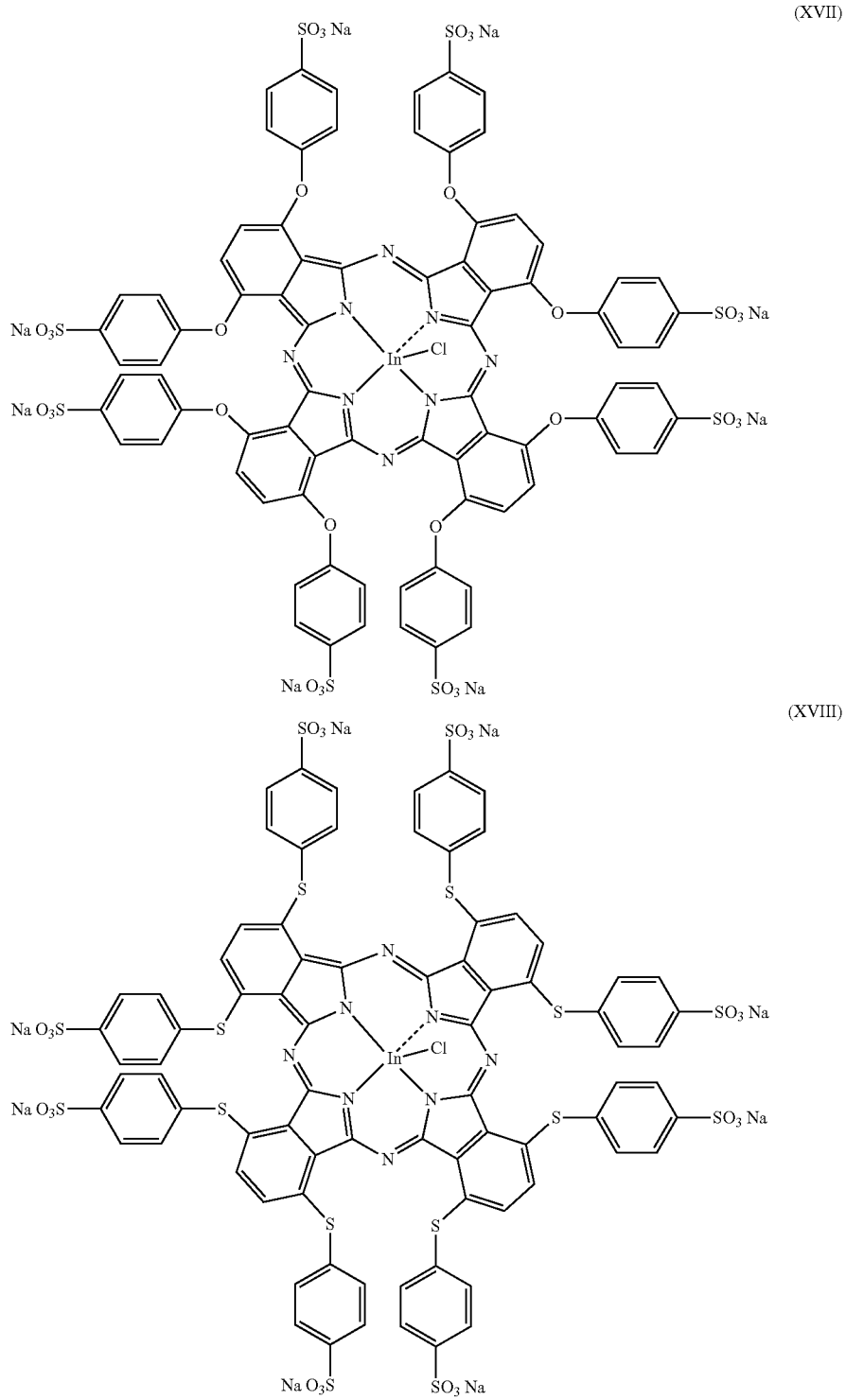

(XVII)

(XVIII)

In embodiments of the phthalocyanine dyes according to general structures (I) to (IV), the substituents A, B to L and P, Q, S and T and the substituents $R^2$ are attached to various aryl groups of the phthalocyanine dyes. In an embodiment, one of embodiments of the present disclosure. By "aryl group of the phthalocyanine dye", it is meant either a benzene ring moiety (i.e., benzene moiety or benzo moiety) of the respective component or a benzene ring-derived substituent group attached to a benzene moiety of the component (e.g., a phenyl group substituent).

The following provides definitions for terms and phrases used above, which were not previously defined.

The term "substituted" means that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, and thioaryl.

The term "heteroatom" as used herein means nitrogen, oxygen, phosphorus or sulfur. The terms "halo" and "halogen" mean a fluoro, chloro, bromo, or iodo substituent. The term "cyclic" means having an alicyclic or aromatic ring structure, which may or may not be substituted, and may or may not include one or more heteroatoms. Cyclic structures include monocyclic structures, bicyclic structures, and polycyclic structures. The term "alicyclic" is used to refer to an aliphatic cyclic moiety, as opposed to an aromatic cyclic moiety.

The phrase "aromatic ring system" or "aromatic" as used herein includes monocyclic rings, bicyclic ring systems, and polycyclic ring systems, in which the monocyclic ring, or at least a portion of the bicyclic ring system or polycyclic ring system, is aromatic (exhibits, e.g., π-conjugation). The monocyclic rings, bicyclic ring systems, and polycyclic ring systems of the aromatic ring systems may include carbocyclic rings and/or heterocyclic rings. The term "carbocyclic ring" denotes a ring in which each ring atom is carbon. The term "heterocyclic ring" denotes a ring in which at least one ring atom is not carbon and includes 1 to 4 heteroatoms.

The term "alkyl" as used herein means a branched, unbranched, or cyclic saturated hydrocarbon group, which typically, although not necessarily, contains from 1 to about 50 carbon atoms, or 1 to about 40 carbon atoms, or 1 to about 30 carbon atoms for example. Alkyls include, but are not limited to, methyl, ethyl, n-propyl, isopropyl, n-butyl, isobutyl, t-butyl, octyl, and decyl, for example, as well as cycloalkyl groups such as cyclopentyl, and cyclohexyl, for example. The term "lower alkyl" means an alkyl group having from 1 to 6 carbon atoms. The term "higher alkyl" means an alkyl group having more than 6 carbon atoms, for example, 7 to about 50 carbon atoms, or 7 to about 40 carbon atoms, or 7 to about 30 carbon atoms or more. As used herein, the term "substituted alkyl" means an alkyl substituted with one or more substituent groups. The term "heteroalkyl" means an alkyl in which at least one carbon atom is replaced with a heteroatom. If not otherwise indicated, the term "alkyl" includes unsubstituted alkyl, substituted alkyl, lower alkyl, and heteroalkyl.

The term "alkoxy" as used herein means an alkyl group bound to another chemical structure through a single, terminal ether linkage, having 1 to about 50 carbon atoms, or 1 to about 40 carbon atoms, or 1 to about 30 carbon atoms. As used herein, the term "lower alkoxy" means an alkoxy group, wherein the alkyl group contains from 1 to 6 carbon atoms, and includes, for example, methoxy, ethoxy, n-propoxy, isopropoxy, and t-butyloxy. The term "higher alkoxy" means an alkoxy group wherein the alkyl group has more than 6 carbon atoms, for example, 7 to about 50 carbon atoms, or 7 to about 40 carbon atoms, or 7 to about 30 carbon atoms or more. As used herein, the term "substituted alkoxy" means an alkoxy substituted with one or more substituent groups. The term "heteroalkoxy" means an alkoxy in which at least one carbon atom is replaced with a heteroatom. If not otherwise indicated, the term "alkoxy" includes unsubstituted alkoxy, substituted alkoxy, lower alkoxy, and heteroalkoxy.

The term "thioalkyl" as used herein means an alkyl group bound to another chemical structure through a single, terminal thio (sulfur) linkage, having 1 to about 50 carbon atoms, or 1 to about 40 carbon atoms, or 1 to about 30 carbon atoms. As used herein, the term "lower thioalkyl" means a thioalkyl group, wherein the alkyl group contains from 1 to 6 carbon atoms, and includes, for example, thiomethyl, thioethyl, and thiopropyl. The term "higher thioalkyl" means a thioalkyl group wherein the alkyl group has more than 6 carbon atoms, for example, 7 to about 50 carbon atoms, or 7 to about 40 carbon atoms, or 7 to about 30 carbon atoms or more. As used herein, the term "substituted thioalkyl" means a thioalkyl substituted with one or more substituent groups. The term "heterothioalkyl" means a thioalkyl in which at least one carbon atom is replaced with a heteroatom. If not otherwise indicated, the term "thioalkyl" includes unsubstituted thioalkyl, substituted thioalkyl, lower thioalkyl, and heterothioalkyl The term "aryl" means a group containing a single aromatic ring or multiple aromatic rings that are fused together, directly linked, or indirectly linked (such that the different aromatic rings are bound to a common group such as a methylene or ethylene moiety). Aryl groups described herein may contain, but are not limited to, from 5 to about 50 carbon atoms, or 5 to about 40 carbon atoms, or 5 to 30 carbon atoms or more. Aryl groups include, for example, phenyl, naphthyl, anthryl, phenanthryl, biphenyl, diphenylether, diphenylamine, and benzophenone. The term "substituted aryl" refers to an aryl group including one or more substituent groups. The term "heteroaryl" means an aryl group in which at least one carbon atom is replaced with a heteroatom. If not otherwise indicated, the term "aryl" includes unsubstituted aryl, substituted aryl, and heteroaryl.

The term "aryloxy" as used herein means an aryl group bound to another chemical structure through a single, terminal ether (oxygen) linkage, having from 5 to about 50 carbon atoms, or 5 to about 40 carbon atoms, or 5 to 30 carbon atoms or more. The term "phenoxy" as used herein is aryloxy wherein aryl is phenyl.

The term "thioaryl" as used herein means an aryl group bound to another chemical structure through a single, terminal thio (sulfur) linkage, having from 5 to about 50 carbon atoms, or 5 to about 40 carbon atoms, or 5 to 30 carbon atoms or more. The term "thiophenyl" as used herein is thioaryl wherein aryl is phenyl.

The term "acetyl" as used herein means an acetyl group bound to another chemical structure through a single acetyl group having from 1 to about 50 carbon atoms, or 5 to about 40 carbon atoms, or 5 to 30 carbon atoms or more.

In an embodiment of the present disclosure, the phthalocyanine as described above are prepared from the corresponding phthalonitrile, phthalic acid, phthalic anhydride or diiminoisoindoline compounds with the desired stoichiometry. In an embodiment, these compounds are mixed together with all the precursors and heated to higher temperature. In an embodiment, the phthalocyanine as described above could be further purified by column chromatography separation and/or recrystallization techniques. In an embodiment, the phthalocyanine compounds are made in a single step synthetic process from their precursors, such as aromatic 2,3-dicyano- or 2,3-carboxylic acids or anhydrides and their corresponding metallic compounds. These compounds are made into water soluble compounds by incorporating sulfonate or other water soluble groups on the aromatic rings. Alternatively, in another embodiment, if these water soluble groups contain aromatic 2,3-dicyano- or 2,3-dicarboxylic acids or anhydrides and their corresponding metallic compounds, they can get the final water soluble form itself.

The NIR-absorbing phthalocyanine dye embodiments of the present invention find use in water-based ink systems, for example, inkjet inks for inkjet printers, for a variety of applications including, but not limited to, print quality, print authenticity, security, print authentication, RFID tags and barcodes, for example.

In the application involving print quality of inkjet printers, an inkjet print head is used to eject ink droplets very accurately in predetermined locations on a substrate. The quantity of nozzles, in an inkjet print head, can range from several nozzles to more than 400 nozzles, each for ejecting ink droplets. As a rule of thumb, the more nozzles present in the print head, generally the better the print quality and speed. However, any of the nozzles in the print head may get blocked or clogged from time to time, possibly due to particles in the inkjet ink dispersions or dry conditions. When a nozzle is clogged or partially blocked, the ink may at least streak on the substrate, and might leave unprinted or partially printed streak mark. Streaking ink equates to poor print quality. By incorporating the NIR-absorbing phthalocyanine dye embodiments of the present disclosure with the inkjet ink, an opportunity to monitor print quality and nozzle operation during printing is provided.

The NIR-absorbing phthalocyanine dye according to embodiments of the present disclosure further provide opportunities to monitor and assess print authenticity, as well as other areas that use ink, because of the unique absorption range of the NIR-absorbing phthalocyanine dye according to embodiments of the present disclosure.

In an embodiment, the present disclosure refers to an inkjet ink formulation including the phthalocyanine dye such as defined herein, above, wherein the phthalocyanine dye is either soluble or dispersed in the inkjet ink. The inkjet ink formulation includes an inkjet ink and a phthalocyanine dye, such as described in the present disclosure, dispersed or dissolved in the inkjet ink. The phthalocyanine dye is stable in the inkjet ink for a shelf life of the inkjet ink. In the inkjet ink formulation, the phthalocyanine dye has a NIR absorption that is shifted into a range of from 700 to 1000. In another embodiment, phthalocyanine dye has a NIR absorption that is shifted to greater than 800 nm, which is distinguishable from any absorption in the visible range of spectrum (400-750 nm) that the inkjet ink might have. The inkjet ink formulation embodiment of the present invention has numerous applications including, but not limited to print quality, as mentioned above.

In some embodiments, the inkjet ink is a water soluble inkjet ink (i.e., aqueous ink) based on a mixture of water, glycol and dyes or pigments, for example for most everyday printing applications. In other embodiments, the inkjet ink is a solvent-based ink made with volatile organic compounds (VOC). The solvent-based inks find use in printing of vinyl substrates (e.g., billboards and banners). In still other embodiments, the inkjet ink is either a UV-curable ink that includes acrylic monomers with an initiator that cured by exposure to strong UV-light or a dye sublimation ink that includes a sublimation dye and is used to print directly or indirectly on to fabrics having polyester fibers, for example. All of the inkjet inks provide a variety of colors using either the additive red-green-blue (RGB) color model or the subtractive cyan-magenta-yellow-key (CMYK) color model. In an embodiment, inkjet ink including near IR absorbing dye can be a clear ink, without any visible colorants, i.e., without any CMY colorants in it.

In an embodiment, the present disclosure refers to a printing method using inkjet ink formulation including the phthalocyanine dye such as defined herein. In an embodiment, this method includes providing a printing system, e.g., an inkjet printer, installed with an optical sensing system, which includes an infrared light emitting diode (LED) device (illuminant) configured to emit infrared radiation that matches the spectral absorbance of the NIR phthalocyanine dye in the inks, i.e., emits electromagnetic light energy within the near infrared spectrum, and an infrared sensor coupled to the LED device. The sensor is capable of detecting absorbance in response to illumination by the LED. At least approximate matching between the emitted electromagnetic energy and the peak absorbance of the NIR material is desired, e.g., peak absorbance of the dye within 50 nm of the infrared light energy emitted from the LED. The sensing system may be a through-page sensing system, which measures transmissive light, and in which the illuminant and the infrared sensor are positioned on opposite sides of the print medium. The sensing system may also be a reflectance-measuring system, which measures the reflected light, and in which the illuminant and the infrared sensor are positioned on the same side of the print medium. When the inks are printed on a paper, the presence of the NIR absorbing dye can be detected using the LED device coupled with the sensor as discussed above. The NIR absorbing dye absorbs some portion of the emitted light from the LED. The decrease in LED intensity is detected by the sensor, which then registers the presence of the NIR dye. By adding a sufficient amount of NIR absorbing dye to the inks, a method of detection can be provided that is independent of the ink colors.

The following examples illustrate a number of embodiments of the present systems and methods that are presently known. However, it is to be understood that the following are only exemplary or illustrative of the application of the principles of the present systems and methods. Numerous modifications and alternative compositions, methods, and systems may be devised by those skilled in the art without departing from the spirit and scope of the present systems and methods. The appended claims are intended to cover such modifications and arrangements. Thus, while the present systems and methods have been described above with particularity, the following examples provide further detail in connection with what are presently deemed to be the acceptable embodiments.

Example 1

Synthesis of Indium Phthalocyanine Dye

An indium phthalocyanine sulfonate dye with sodium ions as counter ions phthalocyanine, having the structure below, is synthesized.

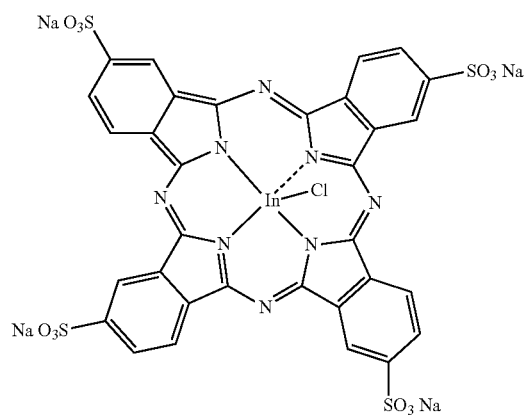

To make the phthalocyanine compound of this example, 7.5 grams of indium chloride is added to 250 ml N,N'-dimethylaniline under nitrogen conditions. Then 1,3-diiminoisoindoline (19.69 grams) is added. This mixture is heated to 195° C. for 7 hours. This mixture is then cooled and the precipitated pigment is filtered and washed with methanol, thoroughly, in view of obtaining a product with phthalocyanine ring having mixed substituents. The product obtained is then dried to obtain a pure pigment. The obtained product (0.3 grams) is afterward mixed with 2.7 ml of fuming sulfuric acid with 20% sulfur trioxide content. The mixture is stirred at ambient temperature for 3 days. Subsequently, the mixture is poured in crushed ice and the precipitated product is filtered in view of obtaining a product in a water soluble form. Excess acid is removed by centrifugation and the obtained precipitate is neutralized with sodium carbonate to a pH of 7.5. The resulting product is further purified by crystallization.

Example 2

Comparative UV Spectrum

The absorption spectrum of the indium phthalocyanine dye, obtained according to example 1, is analyzed. Such as illustrated in FIG. 1, the UV spectrum of the dye, in water, demonstrates an absorbance up to 775 nm.

Furthermore, the solution containing indium phthalocyanine dye obtained according to example 1, is submitted to stressed conditions (an accelerated test) wherein the solution is let in aqueous solution during 10 weeks at 60° C. The absorption range is measured at week 0, 4, 8 and 10. The results are illustrated in FIG. 1. The results demonstrate that the absorption spectrum of the dye is maintained and stable over the 10 weeks. This results show also that the dye does not presents any degradation, crystallization or any chemical change over time. This data demonstrate therefore that the indium phthalocyanine dye is soluble in water and has good stability performances.

Figure 2:
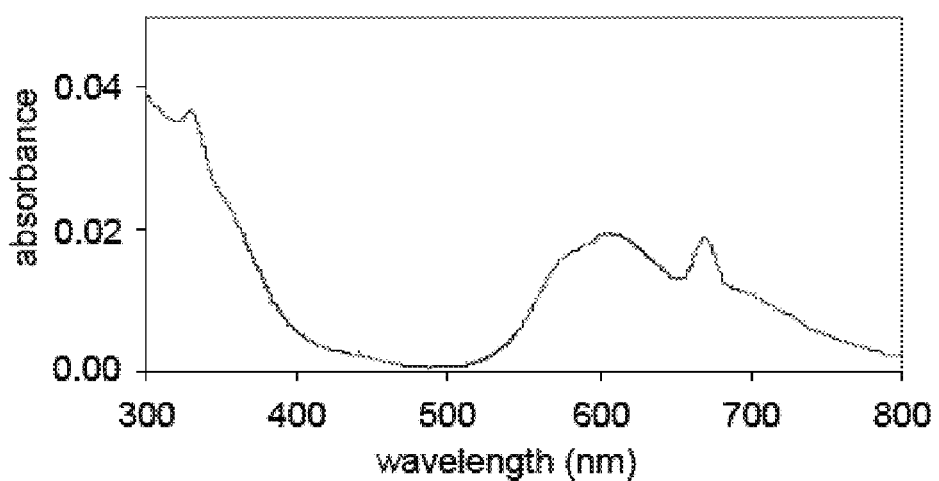
FIG. 2 represents an absorption spectrum in water of a comparative dye.

In comparison, a copper phthalocyanine tetra-sulfonate sodium salt dye (available from Aldrich), having the formula below, is analyzed for it absorption. The absorption spectrum, in water, illustrated in FIG. 2, demonstrate a (maximum) absorption observed at 600 and 675 nm.

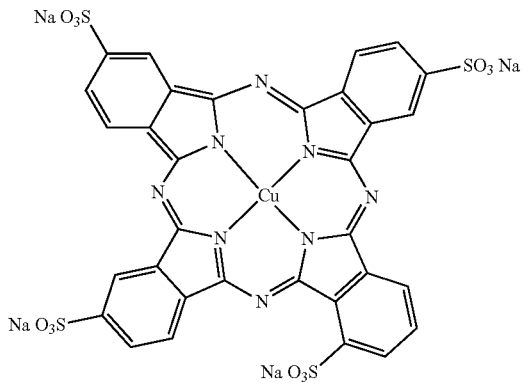

Example 3

Comparative Stability

A solution containing an indium phthalocyanine dye obtained according to example 1 (phthalocyanine dye) and a solution containing a cyanine near IR dye (S0306 available from Few Chemicals GmBH), such as illustrated below, are submitted to stressed conditions wherein the dyes are let in aqueous solution during 10 weeks at 60° C.

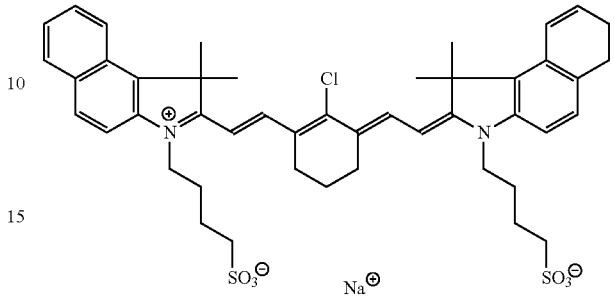

Figure 3:
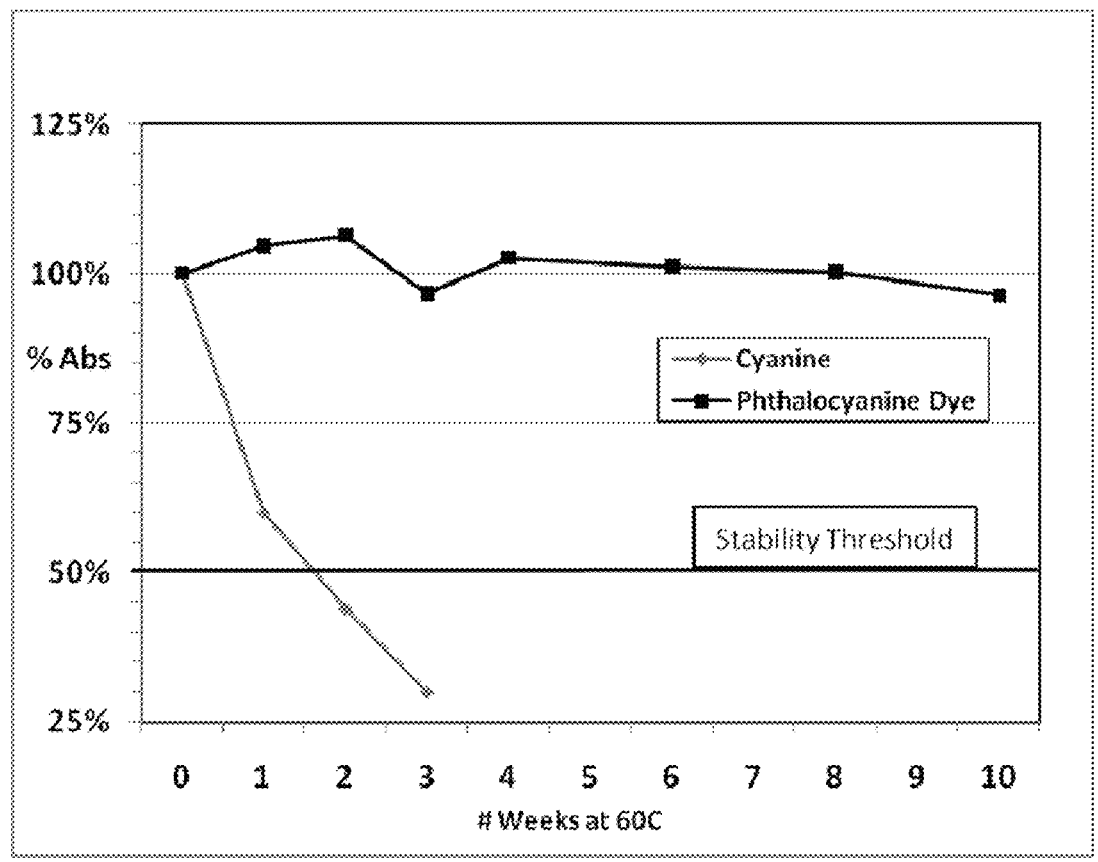
FIG. 3 is a comparative graph plotting the stability of a phthalocyanine dye, according to one embodiment of the present invention, versus a cyanine dye.

The absorption range is measured during those weeks. The results are illustrated in FIG. 3. The results demonstrate that the phthalocyanine dye according to the present disclosure is stable over the 10 weeks whereas the cyanine dye is not. This data demonstrate therefore that indium phthalocyanine dyes according to the present disclosure are soluble in water and have good stability performances.

Example 4

Example of Ink Formulation

An ink composition, containing the phthalocyanine dye obtained according to Example 1 is prepared using the components and ranges as shown in Table 1. The formula is expressed in weight percentage (wt %) of each component in the ink composition.

TABLE 1

| Ingredients | Wt % |
| --- | --- |
| 1-(2-Hydroxyethyl)-2-pyrrolidone | 6.50% |
| 1,5-Pentanediol | 2.00% |
| Trimethylol propane | 9.00% |
| Tergitol ® 15-S-7 | 2.00% |
| Trizma ® | 0.20% |
| Proxel ® GXL | 0.10% |
| NIR Dye according to example 1 | 1.00% |
| Water | Up to 100% |

Tergitol®15-S-7 is a surfactant available from Dow Chemical. Proxel®GXL is a biocide available from Zeneca. Trizma® is a pH buffer available from Sigma-Aldrich.

It should be understood that the above-described embodiments are merely illustrative of some of the many specific embodiments that represent the principles of the present invention. Clearly, those skilled in the art can readily devise numerous other arrangements without departing from the scope of the present invention as defined by the following claims. Many modifications and variations are possible in light of the above teaching. It is intended that the scope of the invention be defined by the following claims.

What is claimed is:

1. A phthalocyanine dye represented by the general structure (II):

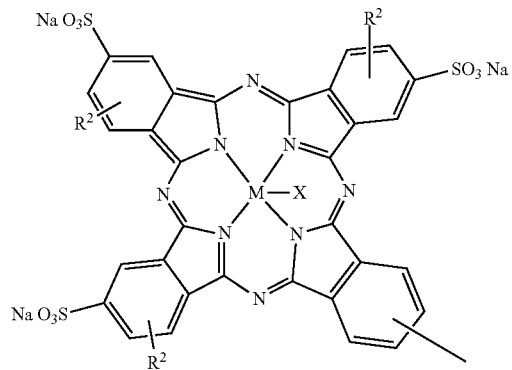

(II)

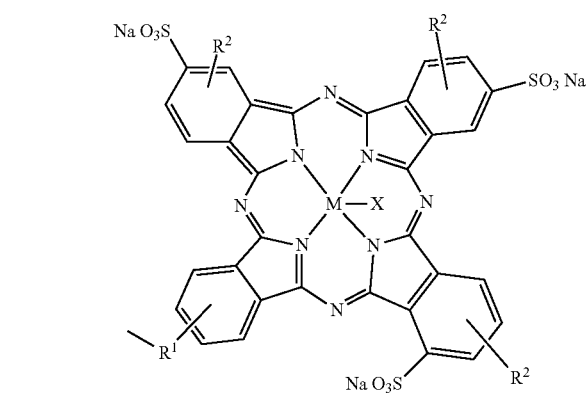

wherein:
X is OH, Cl, Br, F, an alkoxy group, a substituted alkoxy group, an acetyl group, a substituted acetyl group, or $OSO_3M^2$;

M is a metal ion selected from the group consisting of In, Y, Sc, Ga, Tl, and Al;

$R^1$ is selected from the group consisting of O, CO, COO, $C_nH_{2n}$ wherein n is from 1 to 4, NH, CONH, S, $SO_2$, and $SO_2NH$;

$R^2$ is H, an alkyl group, a substituted alkyl group, or a monovalent organic group selected from the group consisting of an alkoxy group and an aryloxy group;

$M^2$ is independently selected from the group consisting of H and a monovalent metal cation, the monovalent cation being $Na^+$, $K^+$, or $N(R^3)_4^+$; and $R^3$ is independently selected from the group consisting of H, an alkyl group, a substituted alkyl group, an aryl group, and a substituted aryl group.

2. The phthalocyanine dye according to claim 1 wherein, in the general structure (II), M is Ga or In.

3. The phthalocyanine dye according to claim 1 wherein, in the general structure (II), M is indium (In).

4. The phthalocyanine dye according to claim 1 wherein, in the general structure (II), X is Cl, OH, $OSO_3M^2$ with $M^2$ being Na, or an alkoxy group having the formula $OC_nH_{2n+1}$ wherein n is from 1 and 8.

5. The phthalocyanine dye according to claim 1 wherein, in the general structure (II), X is Cl.

6. An inkjet ink formulation comprising the phthalocyanine dye as defined in claim 1, wherein said phthalocyanine dye is either soluble or dispersed in the inkjet ink.

7. The phthalocyanine dye according to claim 1 wherein, in the general structure (II), the divalent linking group $R^1$ is O, CO, or $C_nH_{2n}$ wherein n is 1 or 2.

8. A phthalocyanine dye represented by one of the general structures (I) to (IV):

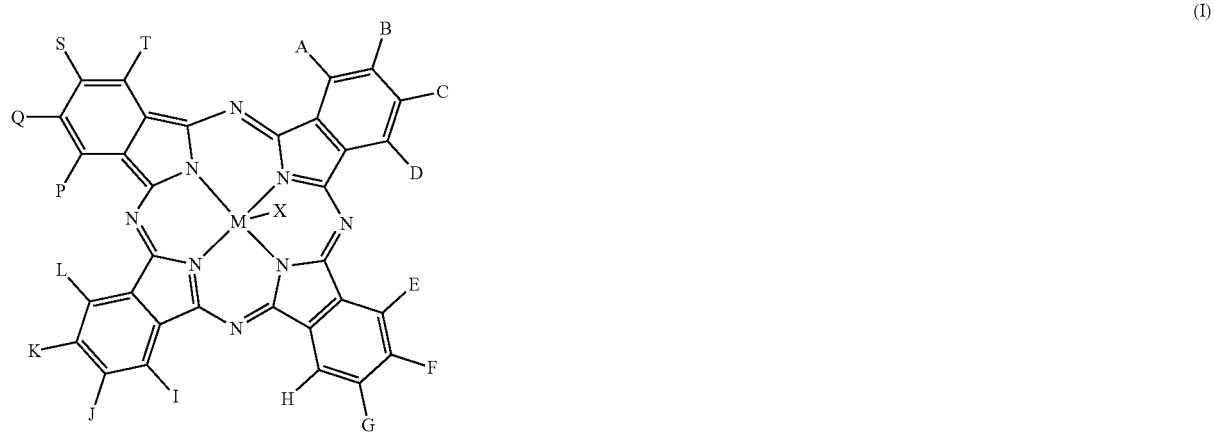

(I)

-continued

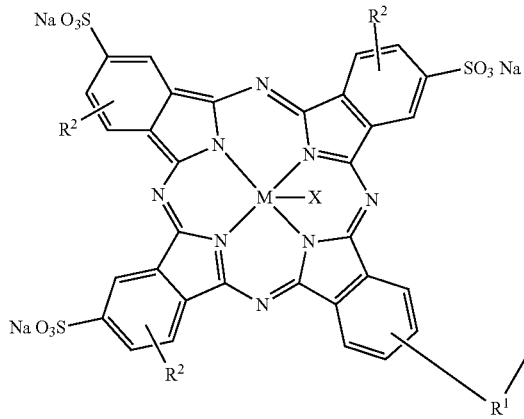
(I)

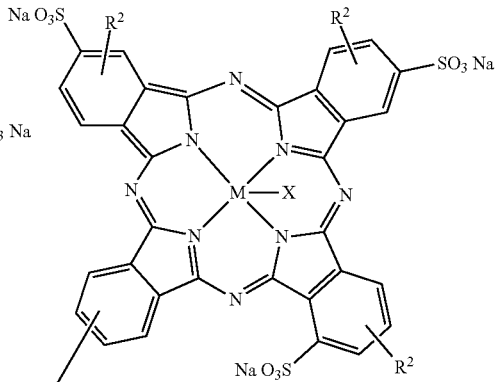
(II)

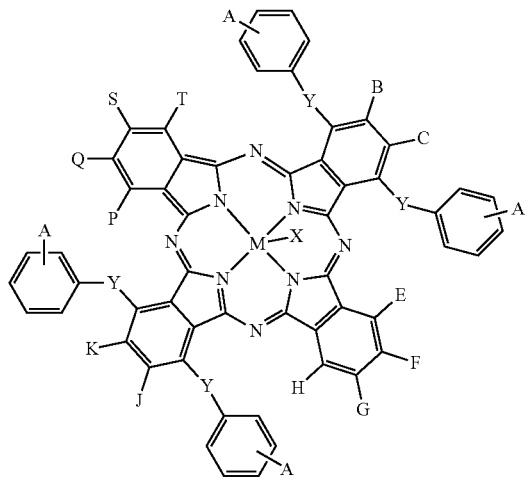
(III)

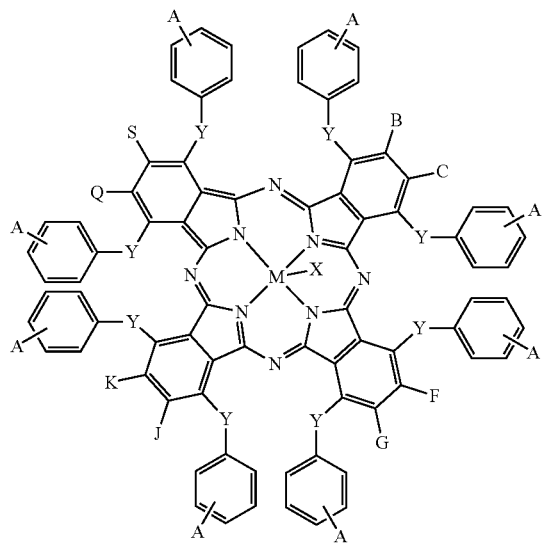
(IV)

wherein, in these formulas:

X is $OSO_3M^2$ with $M^2$ being Na;

M is a metal ion selected from the group consisting of In, Y, Sc, Ga, Tl, and Al;

A to L and P, Q, S and T are independently H, an alkyl group, a substituted alkyl group, an aryl group, a substituted aryl group, a thioalkyl group, a thioaryl group, a substituted thioalkyl group, a substituted thioaryl group, an alkoxy group, a substituted alkoxy group, $SO_3M^2$, OH, SH, $NH_2$, $OCOR^2$, $COOM^2$, $PO_3M^2{}_2$, $N(R^3)_3{}^+X'^-$ with X' being Cl, Br, $OSO_3$ or $ClO_4$, or $O(CH_2CH_2O)_mCH_3$ with m being from 1 to 500; wherein, in formula (I), at least one of the substituents A to L, P, Q, S or T is selected from the group consisting of $SO_3M^2$, OH, $OCOR^2$, $COOM^2$, $PO_3M^2{}_2$, $N(R^3)_3{}^+X'^-$ with X' being Cl, Br, $OSO_3$ or $ClO_4$, and $O(CH_2CH_2O)_mCH_3$ with m being from 1 to 500; and wherein, in formulas (III) and (IV), at least one substituent A is selected from the group consisting of $SO_3M^2$, OH, $OCOR^2$, $COOM^2$, $PO_3M^2{}_2$, $N(R^3)_3{}^+X'^-$ with X' being Cl, Br, $OSO_3$ or $ClO_4$, and $O(CH_2CH_2O)_mCH_3$ with m being from 1 to 500;

$R^1$ is selected from the group consisting of O, CO, COO, $C_nH_{2n}$ wherein n is from 1 to 4, NH, CONH, S, $SO_2$, and $SO_2NH$;

$R^2$ is H, an alkyl group, a substituted alkyl group, or a monovalent organic group selected from the group consisting of an alkoxy group and an aryloxy group;

Y is independently selected from the group consisting of O, NH, and S; and $R^3$ is independently selected from the group consisting of H, an alkyl group, a substituted alkyl group, an aryl group, and a substituted aryl group.

9. The phthalocyanine dye according to claim 8 wherein, in the general structure (I), the substituents A to L and P, Q, S and T are independently H, an alkyl group, a substituted alkyl group, an aryl group, a substituted aryl group, a thioalkyl group, a substituted thioalkyl group, an alkoxy group, a substituted alkoxy group, $SO_3M^2$, OH, SH, $NH_2$, $COOM^2$, $PO_3M^2{}_2$, $N(R^3)_3{}^+X'^-$ with X' being Cl, Br, $OSO_3$ or $ClO_4$, or $O(CH_2CH_2O)_mCH_3$ wherein m is from 1 to 100; and wherein at least one of the substituents A to L, P, Q, S or T is a water soluble group selected from the group consisting of $SO_3M^2$, OH, $COOM^2$, $PO_3M^2{}_2$, $N(R^3)_3{}^+X'^-$ with X' being Cl, Br, $OSO_3$ or $ClO_4$, and $O(CH_2CH_2O)_mCH_3$ wherein m is from 1 to 10, with $M^2$ being $Na^+$ and with $R^3$ being H.

10. The phthalocyanine dye according to claim 8 wherein, in the general structure (I), the substituents A to L and P, Q, S and T are independently H, an alkyl group, a substituted alkyl group, an aryl group, a substituted aryl group, a thioalkyl group, a substituted thioalkyl group, an alkoxy group, a substituted alkoxy group, OH, SH, $NH_2$, $COO^-Na^+$, $NH_3^+X'^-$ with X' being Cl, Br, $OSO_3$ or $ClO_4$, or $O(CH_2CH_2O)_mCH_3$ wherein m is from 1 to 10; and wherein at least one of the substituents A to L, P, Q, S or T is $SO_3Na$.

11. The phthalocyanine dye according to claim 8 wherein, in the general structures (III) or (IV), the substituents B to L and P, Q, S and T are independently H or an alkyl group having the formula $C_nH_{2n+1}$ wherein n is from 1 to 4.

12. The phthalocyanine dye according to claim 8 wherein, in the general structures (III) or (IV), Y is O or S.

13. An inkjet ink formulation comprising the phthalocyanine dye as defined in claim 8, wherein said phthalocyanine dye is either soluble or dispersed in the inkjet ink.

14. A phthalocyanine dye represented by one of the general structures (I) to (IV):

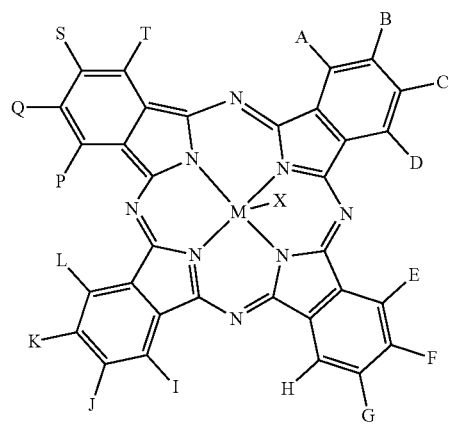

(I)

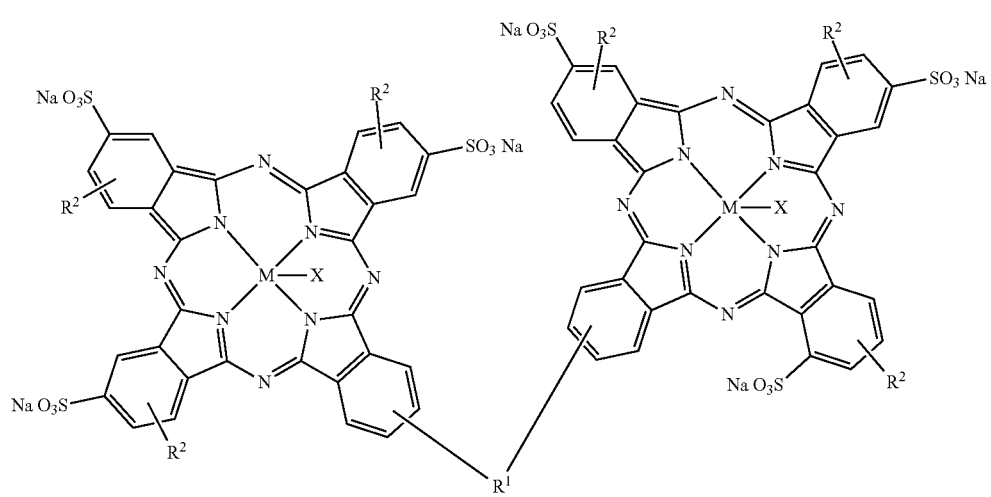

(II)

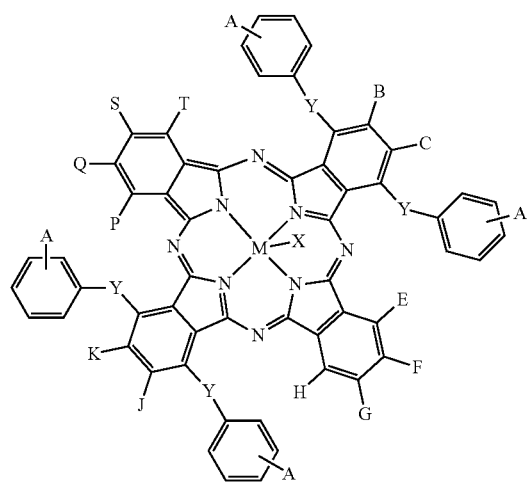

(III)

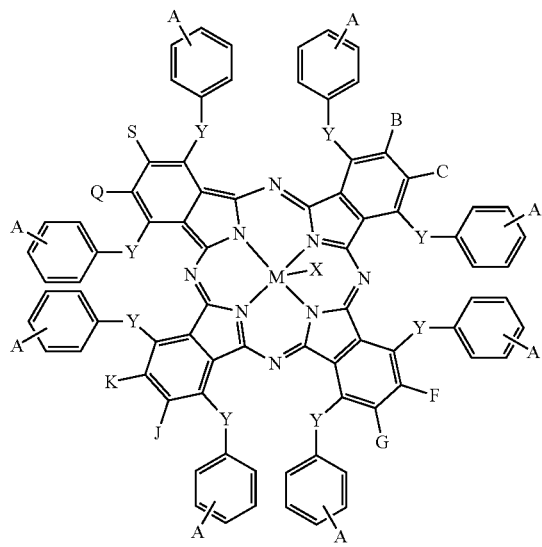

(IV)

wherein, in these formulas:
- X is OH, Cl, Br, F, an alkoxy group, a substituted alkoxy group, an acetyl group, a substituted acetyl group, or $OSO_3M^2$;
- M is In;
- A to L and P, Q, S and T are independently H, an alkyl group, a substituted alkyl group, an aryl group, a substituted aryl group, a thioalkyl group, a thioaryl group, a substituted thioalkyl group, a substituted thioaryl group, an alkoxy group, a substituted alkoxy group, $SO_3M^2$, OH, SH, $NH_2$, $OCOR^2$, $COOM^2$, $PO_3M^2{}_2$, $N(R^3)_3{}^+X'^-$ with X' being Cl, Br, $OSO_3$ or $ClO_4$, or $O(CH_2CH_2O)_mCH_3$ with m being from 1 to 500; wherein, in formula (I), at least one of the substituents A to L, P, Q, S or T is selected from the group consisting of $SO_3M^2$, OH, $OCOR^2$, $COOM^2$, $PO_3M^2{}_2$, $N(R^3)_3{}^+X'^-$ with X' being Cl, Br, $OSO_3$ or $ClO_4$, and $O(CH_2CH_2O)_mCH_3$ with m being from 1 to 500; and wherein, in formulas (III) and (IV), at least one substituent A is selected from the group consisting of $SO_3M^2$, OH, $OCOR^2$, $COOM^2$, $PO_3M^2{}_2$, $N(R^3)_3{}^+X'^-$ with X' being Cl, Br, $OSO_3$ or $ClO_4$, and $O(CH_2CH_2O)_mCH_3$ with m being from 1 to 500;
- $R^1$ is selected from the group consisting of O, CO, COO, $C_nH_{2n}$ wherein n is from 1 to 4, NH, CONH, S, $SO_2$, and $SO_2NH$;
- $R^2$ is H, an alkyl group, a substituted alkyl group, or a monovalent organic group selected from the group consisting of an alkoxy group and an aryloxy group;
- Y is independently selected from the group consisting of O, NH, and S;
- $M^2$ is independently selected from the group consisting of H and a monovalent metal cation, the monovalent cation being $Na^+$, $K^+$, or $N(R^3)_4{}^+$; and
- $R^3$ is independently selected from the group consisting of H, an alkyl group, a substituted alkyl group, an aryl group, and a substituted aryl group.

15. An inkjet ink formulation comprising the phthalocyanine dye as defined in claim 14, wherein said phthalocyanine dye is either soluble or dispersed in the inkjet ink.

16. The phthalocyanine dye according to claim 14 wherein, in the general structures (I) to (IV), X is Cl, OH, $OSO_3M^2$ with $M^2$ being Na, or an alkoxy group having the formula $OC_nH_{2n+1}$ wherein n is from 1 and 8.

17. The phthalocyanine dye according to claim 14 wherein, in the general structure (I):
- X is Cl;
- A, C, D, E, F, H, I, K, L, P, S and T are H; and
- B, G, J, and Q are $SO_3Na$.

18. A phthalocyanine dye represented by the general structure (II):

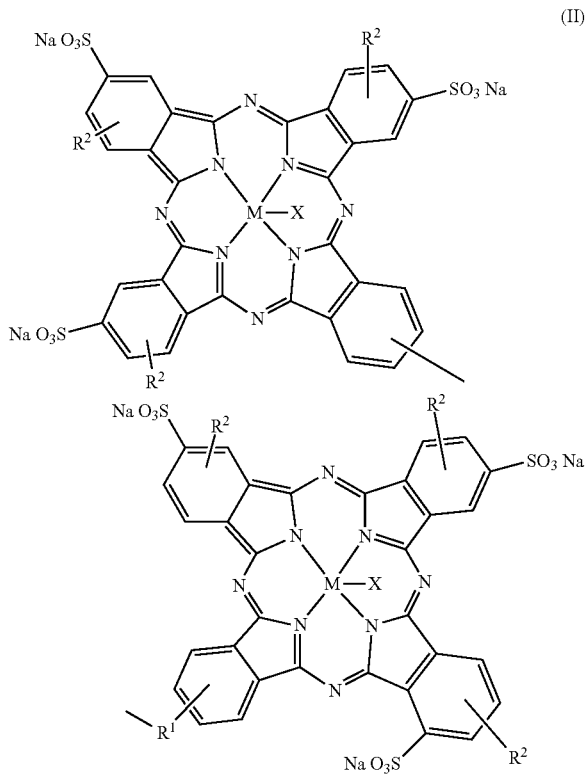

(II)

wherein, in structure (II):

X is OH, Cl, Br, F, an alkoxy group, a substituted alkoxy group, an acetyl group, a substituted acetyl group, or $OSO_3M^2$;

M is a metal ion selected from the group consisting of In, Y, Sc, Ga, Tl, and Al;

$R^1$ is selected from the group consisting of O, CO, COO, $C_nH_{2n}$ wherein n is from 1 to 4, NH, CONH, S, $SO_2$, and $SO_2NH$;

$R^2$ is H or an alkyl group having the formula $C_nH_{2n+1}$ wherein n is from 1 to 4;

$M^2$ is independently selected from the group consisting of H and a monovalent metal cation, the monovalent cation being $Na^+$, $K^+$, or $N(R^3)_4^+$; and $R^3$ is independently selected from the group consisting of H, an alkyl group, a substituted alkyl group, an aryl group, and a substituted aryl group.

19. An inkjet ink formulation comprising the phthalocyanine dye as defined in claim 18, wherein said phthalocyanine dye is either soluble or dispersed in the inkjet ink.

20. A phthalocyanine dye represented by one of the general structures (III) and (IV):

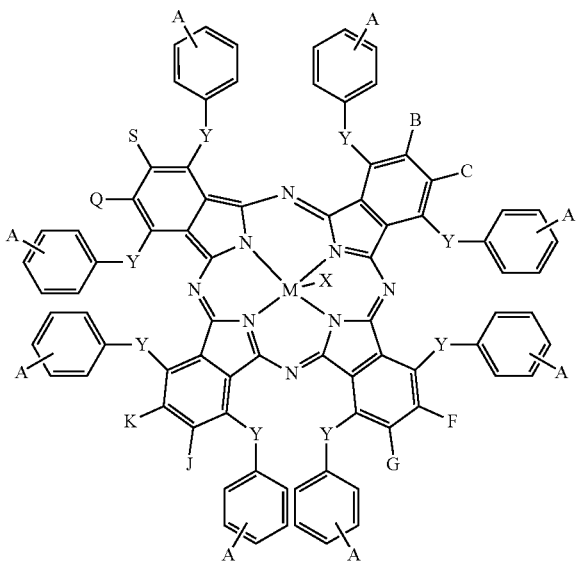

wherein, in structures (III) and (IV):

X is OH, Cl, Br, F, an alkoxy group, a substituted alkoxy group, an acetyl group, a substituted acetyl group, or $OSO_3M^2$;

M is a metal ion selected from the group consisting of In, Y, Sc, Ga, Tl, and Al;

B, C, E, F, G, H, J, K, P, Q, S and T are independently H, an alkyl group, a substituted alkyl group, an aryl group, a substituted aryl group, a thioalkyl group, a thioaryl group, a substituted thioalkyl group, a substituted thioaryl group, an alkoxy group, a substituted alkoxy group, $SO_3M^2$, OH, SH, $NH_2$, $OCOR^2$, $COOM^2$, $PO_3M^2{}_2$, $N(R^3)_3{}^+X'^-$ with X' being Cl, Br, $OSO_3$ or $ClO_4$, or $O(CH_2CH_2O)_mCH_3$ with m being from 1 to 500, and with $M^2$ independently selected from the group consisting of H and a monovalent metal cation, the monovalent cation being $Na^+$, $K^+$, or $N(R^3)_4{}^+$, where $R^3$ is independently selected from the group consisting of H, an alkyl group, a substituted alkyl group, an aryl group, and a substituted aryl group;

A is $SO_3M^2$ with $M^2$ being Na; and

Y is independently selected from the group consisting of O, NH, and S.

21. An inkjet ink formulation comprising the phthalocyanine dye as defined in claim 20, wherein said phthalocyanine dye is either soluble or dispersed in the inkjet ink.

22. The phthalocyanine dye according to claim 20 wherein, in the general structures (III) and (IV), Y is O or S.

23. The phthalocyanine dye according to claim 20 wherein, in the general structures (III) and (IV), the substituents B to L and P, Q, S, and T are independently H or an alkyl group having the formula $C_nH_{2n+1}$ wherein n is from 1 to 4.

* * * * *

UNITED STATES PATENT AND TRADEMARK OFFICE
CERTIFICATE OF CORRECTION

PATENT NO.         : 8,226,757 B2                                   Page 1 of 2
APPLICATION NO.    : 12/603994
DATED              : July 24, 2012
INVENTOR(S)        : Sivapackia Ganapathiappan et al.

It is certified that error appears in the above-identified patent and that said Letters Patent is hereby corrected as shown below:

In column 25, lines 6-39, in Claim 1, delete " 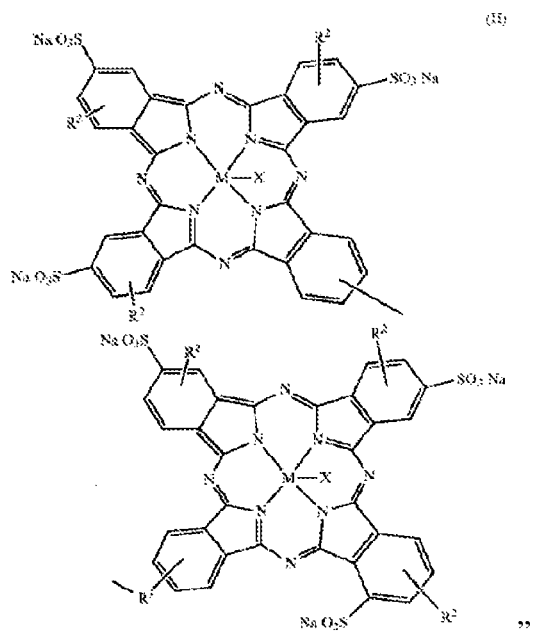 "

and insert -- 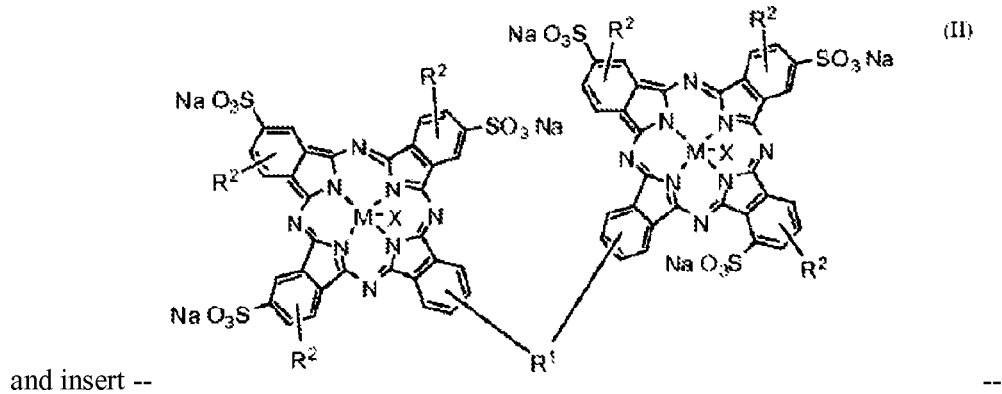 --, therefor.

Signed and Sealed this
Nineteenth Day of February, 2013

Teresa Stanek Rea
*Acting Director of the United States Patent and Trademark Office*

CERTIFICATE OF CORRECTION (continued)
U.S. Pat. No. 8,226,757 B2

In column 26, line 31, in Claim 4, delete "1 and 8." and insert -- 1 to 8. --, therefor.

In column 32, line 27, in Claim 16, delete "1 and 8." and insert -- 1 to 8. --, therefor.

In column 32, lines 37-66, in Claim 18, delete " 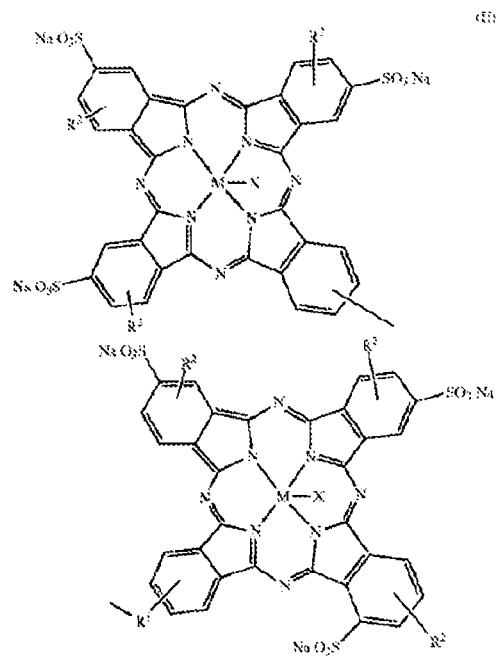 "

and insert -- 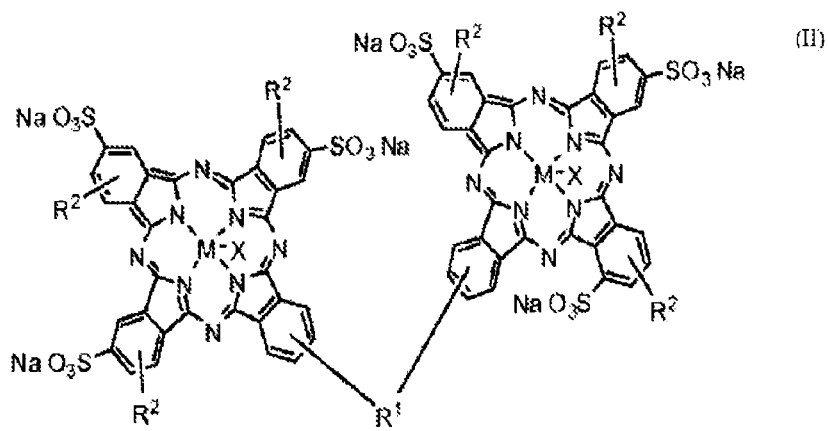 --, therefor.